May 30, 1972    W. PAGE ET AL    3,666,324
VEHICLE BRAKING SYSTEMS
Filed Dec. 8, 1969    3 Sheets-Sheet 3

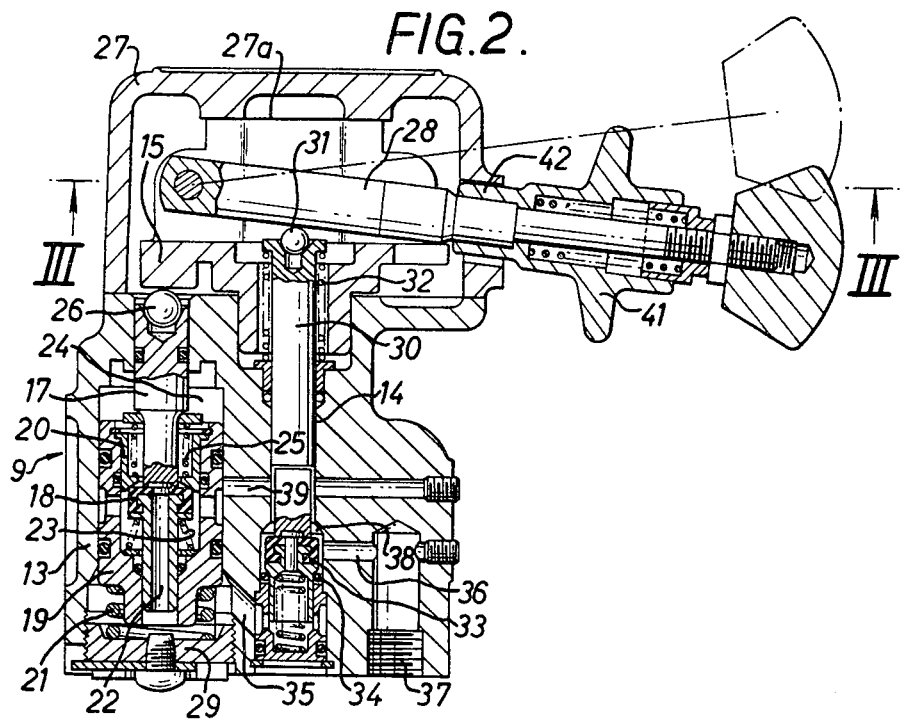
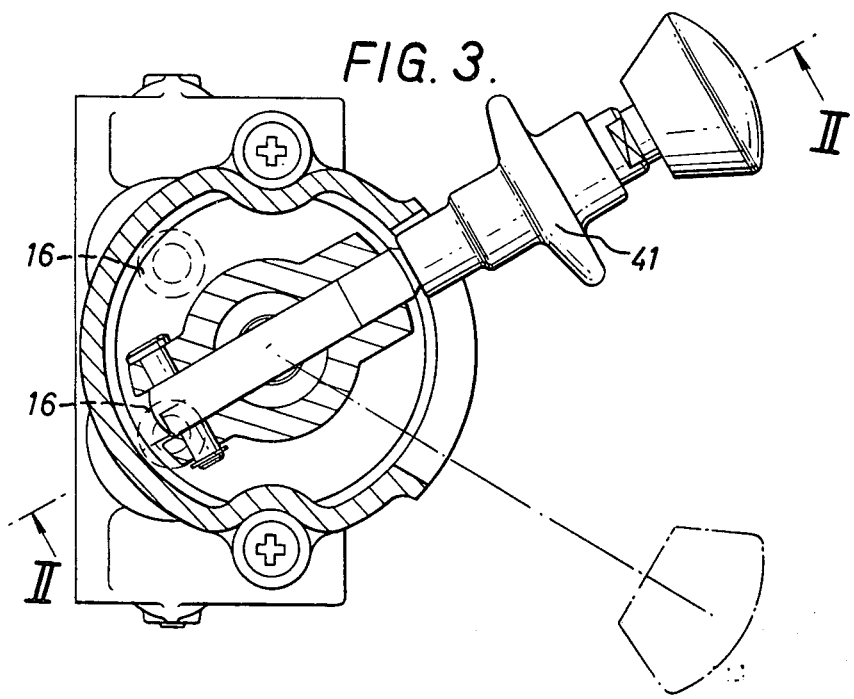

INVENTORS
WILBUR M. PAGE
RALPH COUPLAND

ATTORNEYS

Norris & Bateman

# United States Patent Office 3,666,324
Patented May 30, 1972

3,666,324
VEHICLE BRAKING SYSTEMS
Wilbur M. Page, Bracebridge Heath, and Ralph Coupland, Lincoln, England, assignors to Clayton Dewandre Company Limited, Lincoln, England
Filed Dec. 8, 1969, Ser. No. 883,209
Claims priority, application Great Britain, Dec. 6, 1968, 58,092/68
Int. Cl. B60t *13/26*
U.S. Cl. 303—9        7 Claims

ABSTRACT OF THE DISCLOSURE

A vehicle braking system for tractor-trailer combinations and which includes air pressure-operated brake units and spring-actuated, air pressure-released brake units comprises a manually-operable control unit incorporating two graduated pressure valves controlling respectively the application of the spring brake units and the auxiliary line to the trailer brakes, and an "on-off" valve for venting all air lines to all brake units.

---

This invention relates to vehicle braking systems of the kind embodying spring-applied brake units, that is, units consisting of a piston and cylinder device of which the piston is spring-loaded and is connected to the brake linkage, said piston being normally held in an inoperative position by a supply of compressed air acting thereon but, on failure or interruption of said supply, moving under the action of the loading spring to apply the brakes.

The object of the present invention is to provide an improved braking system of the kind mentioned and, in such a system, a simple but effective valve device for controlling and limiting the pressure output to the spring brake units in accordance with their operating characteristics whereby the system can be readily adapted to varying spring brake units whilst retaining the use of simple upright relays between the control valve and the spring brake units. The invention also provides a control valve as above mentioned and which additionally can be used to apply the spring brakes and also, in tractor-trailer combinations, permits the performance of the tractor spring brake units to be matched to that of the trailer brake units in order that the effective braking forces are applied at the same time.

According to the invention in a braking system of the kind mentioned a graduated pressure valve of the follow-up type is interposed in the air supply to the spring brake units, the valve being manually operable, preferably through rotary cam means, and the output pressure of the valve being limited by the action of the graduating load spring in the valve, which spring is interchangeable and/or adjustable to accord with operating requirements.

Figure 1:
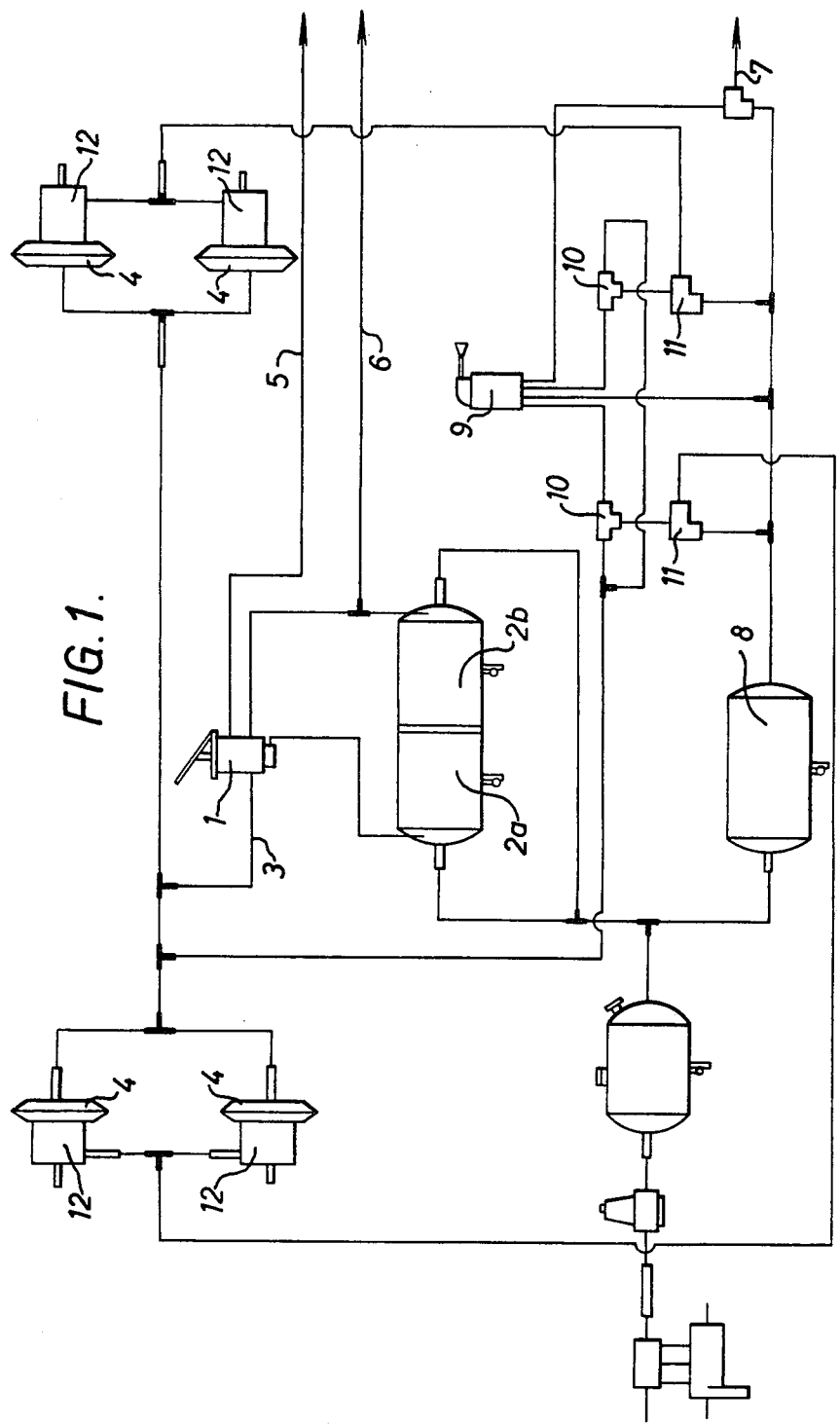
Figure 4:
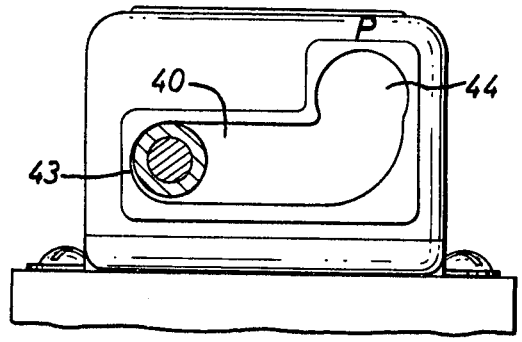
Figure 5:
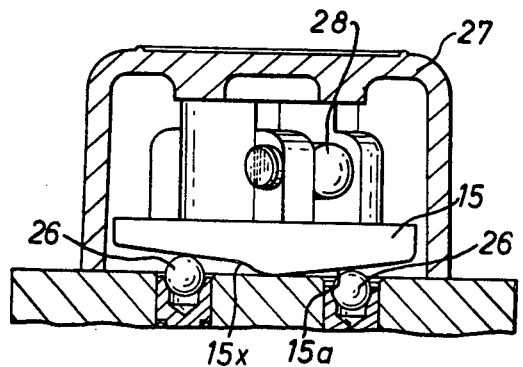

One specific application of the invention is to the braking system of an articulated or tractor-trailer vehicle of which the tractor is fitted with both air pressure brake motors and spring brake units, the graduated pressure valve controlling application of the spring brakes on the tractor being duplicated by a second graduated pressure valve controlling the third or auxiliary line to the trailer or trailer axle braking system, and these two graduated valves being under a common manual control which also includes a "Park" setting at which all lines are vented to exhaust thus releasing all air brakes and applying all spring brakes, and such a system will now be described with reference to the accompanying drawings wherein:

FIG. 1 is a diagrammatic view of the basic tractor braking system,
FIG. 2 is a sectional elevation of the improved control valve used therein and taken on the line II—II of FIG. 3,
FIG. 3 is a cross section on the line III—III of FIG. 2,
FIG. 4 is a fragmentary side view of the valve, and
FIG. 5 is a fragmentary view of the rotary cam means.

Referring first to FIG. 1, the system includes a pedal-actuated dual brake valve 1 controlling two air supply lines from a divided reservoir 2*a*, 2*b* and having a first output 3 to the tractor air brake motors 4 and a second output constituting the service line 5 to the trailer axle brakes. A branch line 6 from the reservoir section 2*b* constitutes the trailer axle emergency line whilst the trailer "third" or auxiliary line 7 is fed from a separate air reservoir 8. Interconnected into the system is a manually-operable valve unit 9 which controls through change-over valves 10 and relays 11 the supply of compressed air to the air chambers 12 of the spring brake units and to the trailer auxiliary line 7 and the exhaustion or venting of these components, and this valve unit will now be described in detail with reference to FIGS. 2–5. This unit is adapted to be conveniently mounted in the driver's cab for manual operation and comprises a substantially cylindrical housing 13 having an axial bore 14 enlarged at its upper end to receive the stem of a rotary cam 15. Disposed in separate bores in the valve housing parallel to the axial bore is a pair of graduated pressure valve assemblies 16, each assembly comprising an axial spring-loaded plunger 17 located above a tubular valve element 18 which is guided for axial movement in a cylindrical body 19 and is spring-loaded towards an annular seating member 20 secured within said body. The cylindrical body 19 is slidable in the housing bore and is urged upwardly by a graduating load spring 21, the arrangement being such that downward movement of the plunger 17 from an upper limit position first causes its lower end to abut the tubular valve 18 and close off an exhaust passage 22 therethrough, whilst further movement of the plunger then displaces the tubular valve from its seating 20 and establishes communication between a chamber 23 connected to the air supply and an upper chamber 24 connected to the component or unit controlled by the valve. However, the thrust of the plunger is also transmitted through a spring 25 to the valve seating 20 and as the latter is fast with the cylindrical body 19, it yields against the action of the graduating load spring 21 and a follow-up action is necessary to maintain the valve open.

The plungers of the two assemblies each support at its upper end a ball-type follower 26 which rides on a cam face 15*a* (FIG. 5) formed on an arcuate flange of the rotary cam 15, a hand lever 28 extending laterally through a housing cover member 27 serving to rotate the cam.

As previously mentioned the graduated pressure valve 16 control respectively the spring brake units 12 and the auxiliary line 7 to the trailer axle brakes and to effect balanced braking, therefore, it is necessary that the two valves be operated simultaneously but oppositely, that is, while the first valve is being moved wholly or partly towards the closed position to cut off the air supply to the spring brakes and connect them to exhaust, the second valve is being moved from the closed towards the open position to admit air to the trailer brake motors. This is achieved by the rotary cam element 15 which is arranged to rotate through an arc of about 60°, its cam face 15*a* having a high land at its mid-point inclining downwards towards each end, although the cam face is stepped as at 15*x* at that side which actuates the first graduated pressure valve to give a rapid output pressure drop from the spring brake units and ensure that these brakes are applied at the same time as the trailer brakes.

The output pressure from the first graduated pressure valve is limited to suit the optimum hold-off pressure required by the spring brake units by the use of an appropriate graduating load spring 21, interchangeable to suit different spring brake units, although a screw abutment 29 for the lower end of spring 21 permits limited abutment of the spring force for obtaining an exact output pressure. The output pressure of the other graduated pressure valve is similarly variable and adjustable to provide the required trailer brake control.

An additional feature of the control device above described is the provision of an "on-off" valve which facilitates use of the spring brakes for parking. Located in the axial bore 14 is a plunger 30 which at its upper end abuts the hand lever 28, preferably through a ball and socket connection 31, the hand lever being pivotally attached at its inner end to the rotary cam for oscillatory movement in a vertical plane whereby the plunger 30 can be displaced in its bore by raising and lowering the hand lever. The plunger is urged upwardly by a spring 32 and, acting through the hand lever, holds the cam structure in abutment with a guide surface 27a on the cover member. The lower end of the plunger 30 co-operates with a spring-loaded tubular valve element 33, similar to the valves 18 in the graduated pressure valves, and located in a counterbore 34 at the lower end of axial bore 14. The lower end of this counterbore beneath the valve 33 communicates with an evhaust passage 35 permanently connected to atmosphere and also in communication with the exhaust passage 22 of each of the valves 16, whilst the upper end of the counterbore communicates by a passage 36 with an air inlet port 37 and terminates in an annular seating 38 co-operating with the valve 33. Above the valve seating 38 a clearance between the bore 14 and the plunger 30 connects the counterbore to a further passage 39 leading to the chamber 23 of each of valves 16.

The valve unit operates as follows:

Under normal running conditions the hand lever 28, acting through the plunger 30, holds the tubular valve element 33 off its seating 38, that is, in the open position. In this condition of the valve, air pressure from the inlet port 37 is fed through the open inlet seating to the two graduated pressure valves, the exhaust passage in valve 33 being closed off by plunger 30. When the hand lever is lifted, that is moved to the "Park" position, the tubular valve 33 closes onto its seating and then the exhaust connection is opened. Thus the pressure feed to the graduated pressure valves and to the trailer third line is exhausted whereby the trailer air brakes are rendered inoperative whilst all spring brakes are applied.

To ensure correct operation of the hand lever 28 it is caused to move through an L-shaped gate 40 (FIG. 4) in the cover member 27 which permits it to be lifted into the "Park" position "P" only from the full "Brakes-on" position, a spring-loaded hand knob 41 on the lever having a spigot portion 42 which engages a detent 43 in the cover to hold the lever frictionally in the "Brakes-off" position and engages within a socket 44 in the cover member to lock the lever in the "Park" position against non-intentional movement.

It is to be noted that the use of follow-up type valve elements prevents excessive loading of the cam faces whilst the improved control permits the use of simple "upright" relays between the control valve and the spring brakes as compared with the complex inverted relay valves previously used.

We claim:

1. A vehicle braking system having a plurality of spring brake units of the type wherein brake actuating spring means is normally compressed by fluid pressure responsive means disposed in a chamber connected by conduit means to a source of fluid pressure and control valve means is provided in said conduit means for selectively varying the fluid pressure in said chamber, said valve means comprising two reciprocable valves in series and a single operating member, a rotatable cam member on which said operating member is pivoted operably connected to one of said valves, and means connecting the other of said valves to be operated by rocking said operating member about its pivot on said cam member.

2. A vehicle braking system for a tractor-trailer vehicle, said tractor having fluid pressure responsive brake motors and associated spring brake units normally held inoperative by fluid pressure, and said trailer having fluid pressure actuated brakes, valve means comprising two valves connected respectively to control supply of fluid pressure to said spring brake units and to an emergency line to said trailer brakes, a common manual operator for simultaneously and oppositely actuating said two valves, a third valve in said valve means connected to vent said trailer brake motors and said spring units to permit said spring units to apply the vehicle brakes, and means connecting said third valve to be actuated by said operator.

3. A braking system as defined in claim 2, wherein a rotary cam is connected to said operator and operably connected to actuate said two valves, said operator being a hand lever swingable in a plane to rotate said cam, and means mounting said lever from movement away from said plane for actuation of said third valve to vent the tractor motors and spring brake units.

4. A braking system as claimed in claim 3, wherein the rotary cam is so formed that the valve controlling the spring brakes is opened quickly to give rapid pressure drop in the spring brake air chambers and so apply these brakes in unison with the trailer brakes applied by the action of the other graduated pressure valve.

5. A braking system as claimed in claim 3, wherein the hand lever is movable through a gate which permits the third valve to be actuated only after the air brake motors have been activated, releasable locking means being provided for retaining the hand lever in the position to vent the brake air lines.

6. In the braking system defined in claim 2, said valve means comprising a housing, two valves disposed in parallel, relationship, a rotary cam connected to actuate said two valves, a hand lever pivoted on said cam and movable in one direction to rotate said cam, and a spring loaded plunger connected between said third valve and said hand lever, said plunger being normally spring biased to valve open position and being closed by pivotal movement of said hand lever.

7. A control valve unit as claimed in claim 6, wherein the spring-loaded plunger urges the cam and hand lever assembly in a direction to locate it against a guide surface on the housing.

References Cited

UNITED STATES PATENTS

| | | | |
|---|---|---|---|
| 3,241,888 | 3/1966 | Ternent | 303—7 |
| 3,411,833 | 11/1968 | Alfieri | 303—9 X |
| 3,533,661 | 10/1970 | Cruse | 303—9 X |

MILTON BUCHLER, Primary Examiner

J. J. McLAUGHLIN, Assistant Examiner

U.S. Cl. X.R.

303—2, 7, 53, 54